(12) United States Patent
Berube et al.

(10) Patent No.: US 10,295,103 B1
(45) Date of Patent: May 21, 2019

(54) INFLATABLE ISOLATION TOOL WITH ENHANCED MONITORING UNIT

(71) Applicant: Car-Ber Investments Inc., Houston, TX (US)

(72) Inventors: Guy Berube, Sarnia (CA); Graham Travis Cecil Brown, Sarnia (CA); Joseph Tuskan, Wallaceburg (CA)

(73) Assignee: CAR-BER INVESTMENTS INC., Houston, TX (US)

( * ) Notice: Subject to any disclaimer, the term of this patent is extended or adjusted under 35 U.S.C. 154(b) by 0 days.

(21) Appl. No.: 15/916,013

(22) Filed: Mar. 8, 2018

(51) Int. Cl.
*F16L 55/10* (2006.01)
*F16L 55/12* (2006.01)

(52) U.S. Cl.
CPC .................... *F16L 55/12* (2013.01)

(58) Field of Classification Search
CPC ..... F16L 55/132; F16L 55/128; F16L 55/136; F16L 55/124; F16L 55/11; F16L 55/1283; Y10T 137/0475
USPC .............. 138/93, 97, 98; 73/49.5, 49.8, 49.1
See application file for complete search history.

(56) References Cited

U.S. PATENT DOCUMENTS

| | | | |
|---|---|---|---|
| 3,593,749 A * | 7/1971 | Reardon | F16L 55/136 138/93 |
| 3,946,761 A | 3/1976 | Thompson et al. | |
| 4,267,401 A * | 5/1981 | Wilkinson | H01B 17/308 174/151 |
| 4,470,946 A * | 9/1984 | Vassalotti | F16L 55/136 138/90 |
| 4,484,602 A | 11/1984 | Guthrie | |
| 4,848,406 A * | 7/1989 | Stauner | F16L 55/136 138/93 |
| 5,402,828 A * | 4/1995 | Pino | F16L 55/134 138/89 |
| 5,522,432 A * | 6/1996 | Radant | G21C 13/028 138/89 |
| 6,568,429 B2 | 5/2003 | Lundman | |

(Continued)

FOREIGN PATENT DOCUMENTS

| | | |
|---|---|---|
| CA | 2847874 C | 10/2014 |
| EP | 0096958 B1 | 12/1983 |

(Continued)

*Primary Examiner* — Patrick F Brinson
(74) *Attorney, Agent, or Firm* — Adler Pollock & Sheehan P.C.; Daniel J. Holmander, Esq.

(57) ABSTRACT

An isolation tool for positioning in a pipe bore and providing a sealing barrier extending transversely across the pipe bore for isolating a section of the bore during replacement of a pipe section includes: a pair of identical inflatable seals positioned in the tool mid-section by an annular subassembly which secures the seals in position, preventing them from dislodging into the internal tool cavity. Having inflatable seals allows flexibility since the tool can be used within a greater range of pipe diameters. The tool "self-centers" within the pipe in its proper position as gas is pumped into both seals simultaneously through a single gas inlet of a shared plumbing assembly, thereby enabling quick installation and removal. Moveable gripper inserts are tightened against the inner pipe surface to hold the tool stationary. Support leg assemblies assist tool installation and removal. The back plate defines multiple port connections. The tool is electronically monitored by a separate enhanced monitoring unit.

14 Claims, 13 Drawing Sheets

(56) References Cited

U.S. PATENT DOCUMENTS

| | | | |
|---|---|---|---|
| 6,732,762 B2* | 5/2004 | Russell | F16L 55/136 138/89 |
| 6,959,734 B2 | 11/2005 | Lundman | |
| 6,966,343 B1 | 11/2005 | Field | |
| 7,240,697 B2 | 7/2007 | Beebe et al. | |
| 7,779,676 B2* | 8/2010 | Carson | F16L 55/132 138/89 |
| 7,849,882 B1 | 12/2010 | Lee et al. | |
| 8,256,270 B2 | 9/2012 | Fielding et al. | |
| 8,307,856 B2 | 11/2012 | Yeazel et al. | |
| 8,955,551 B2* | 2/2015 | Carson | F16L 55/11 138/89 |
| 2016/0031638 A1* | 2/2016 | Noyon | F16L 55/11 220/315 |
| 2017/0000992 A1 | 1/2017 | Acker et al. | |

FOREIGN PATENT DOCUMENTS

| | | | |
|---|---|---|---|
| WO | 9507433 | A1 | 3/1995 |
| WO | 0047928 | A1 | 8/2000 |

\* cited by examiner

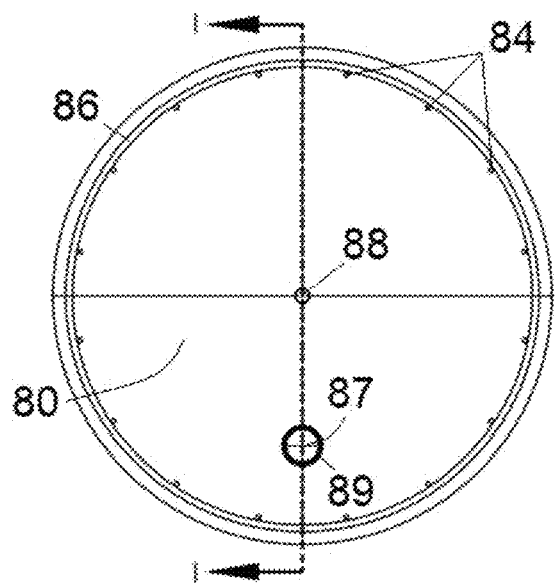
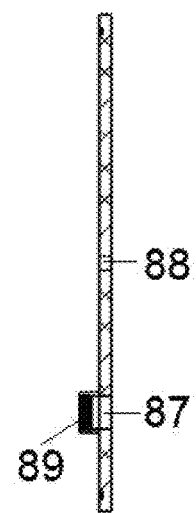
FIG. 6B
FIG. 6C
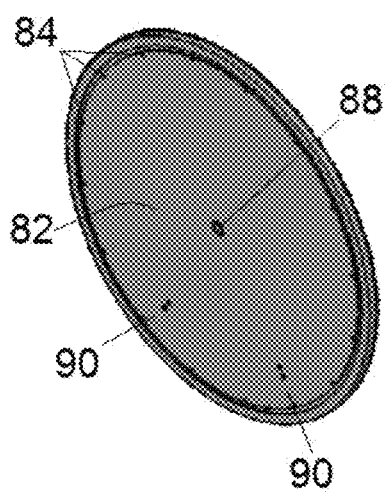
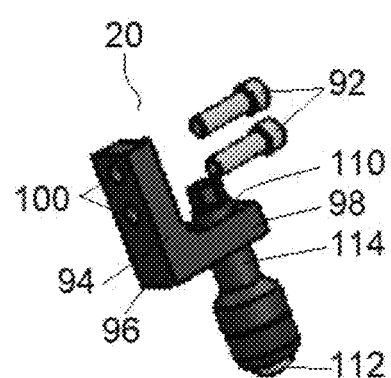
FIG. 6D
FIG. 6E

INFLATABLE ISOLATION TOOL WITH ENHANCED MONITORING UNIT

FIELD OF THE INVENTION

The present invention relates generally to an improved mechanical assembly or isolation tool for use in providing a sealing barrier within a pipe bore during replacement of a section of the pipe, and an enhanced monitoring unit for same.

BACKGROUND OF THE INVENTION

In the fabrication of fluid flow systems, whether for the purposes of conveying liquid such as petro-chemicals, or gases such as natural gas, the use of conduits or pipes is typical. As pipes can be manufactured only to a finite length, various lengths or elbows must be connected together to structure the conduit fluid conveyance means. This is accomplished by welding butt ends of pipes together or to elbows etc., or alternatively, to weld the end of a pipe to a butt flange and to juxtapose two butt flanges together by means commonly known, for example, use of bolts through each juxtaposed annular portions of each butt flange. Generally, such flanges co-operatively employ gaskets as sealing elements. The welds are tested to determine whether there is any leakage since it is mandated that the amount of fluid escaping from any weld or flange/flange interface be reduced to allowable limits.

The problem relates to creating a safe environment for performing hot work on existing pipelines carrying hydrocarbon resources. Canadian Patent No. 2,847,874 (owned by applicant) describes an isolation tool which safely isolates a line for hot work to maintain safety of personnel. The isolation tool is placed into the line upstream of where hot-work is to be performed. Once the isolation tool is properly installed and two outer seals are established, medium is brought to pressure in the annulus between the seals. Once this pressure is established, the seals are actively monitored by the technician to ensure that no harmful vapors are passing beyond the isolation tool into the hot work zone. The problem encountered by applicant with this isolation tool is that as the pipe gets bigger, the isolation tool needs to be bigger also to seal with the bigger pipe. However, this results in a heavier, more expensive tool which is difficult to install or remove. There is also a need to be able to monitor remotely rather than in close proximity to the work zone.

Accordingly, there is a need in the art for an improved isolation tool which mitigates the above problems.

SUMMARY OF THE INVENTION

The present invention relates generally to an improved mechanical assembly or isolation tool for use in providing a sealing barrier within a pipe bore during replacement of a section of the pipe, and an enhanced monitoring unit for same. It was surprisingly discovered that by using the present invention, one or more of the following benefits may be realized:

The tool has a pair of identical inflatable front and back seal elements positioned in the mid-section of the tool by an annular subassembly which has been specifically designed to secure the front and back seal elements in position, preventing them from dislodging into the internal cavity of the tool. Having inflatable seals with a significantly large radial expansion capability in contrast to solid O-ring material allows more flexibility since the tool can be used within a greater range of pipe diameters, thereby enabling many schedules for use with a single tool. This also translates into minimal manufacturing costs (e.g., fewer sizes of isolation tools to manufacture) and substantial operational cost savings for both companies and their clients.

The inflatable front and back seal elements deform in two directions to reduce the risk of leaks—radially inwardly to press and seal against the annular subassembly and radially outwardly into sealing engagement with the pipe, thereby combining with the outer surface of the tool and the inner surface of the pipe to form a tightly sealed annular space.

The tool "self-centers" within the pipe in its proper position as gas is pumped into both front and back inflatable seal elements simultaneously through a single gas inlet of a shared plumbing assembly; and provides a sealed annular volume. The tool may thus compensate for issues with out-of-round piping applications, which is a common problem for larger piping and can be time-consuming for technicians to deal with in the field.

The tool can be installed quickly since the tool "self-centers" and time-consuming torqueing of studs in a specific pattern is not needed. The technician needs only to place the tool within the pipe, adjust the support leg assemblies and gripper inserts of the tool, and pump air into the front and back inflatable seal elements until the tool "self-centers" within the pipe by the front and back seal elements sealing against the inner surface of the pipe. After use, the tool can be removed quickly since the technician needs only to deflate the air from within the front and back seal elements, and readjust the gripper inserts and support leg assemblies. This is a notably substantial improvement in comparison to prior art isolation tools, which require laborious, time-consuming assembly inside the pipe by piecing all components of the isolation tool in place within the pipe, and torqueing and tightening multiple studs according to a predetermined sequence.

The tool includes gripper inserts which are moveable from resting unactuated positions within recesses to actuated positions to extend outwardly from the recesses to contact and grip the inner surface of the pipe. The gripper pads are conveniently moveable and adjustable to be tightened against the inner surface of various diameters of pipe in order to hold the tool stationary in its proper position within the pipe, and to hold back pressure without being moved out of the pipe. The tool is thus easy and quick to deploy and remains stationary and stable within the pipe during use. The gripper inserts are formed of stainless steel for material contact-compatibility considerations. In particular, there is little or no risk of carbon contamination of a stainless steel pipe because the gripper inserts are formed of the same material (i.e., stainless steel). Further, the gripper inserts do not damage the inner diameter of the pipe compared to other prior art tools.

Provision of the gripper inserts eliminates the need to use a commercially available standard gripper kit to provide back pressure-retention capability required by particular jobs, nitrogen purges, line-stop work, etc.

The tool includes support leg assemblies which assist with tool installation and removal, making the tool quick to deploy. The support legs include roller balls which are smooth and will not damage the bottom inner surface of the pipe. The roller balls in the support leg are conveniently moveable and adjustable via screw threads to different distances to accommodate various pipe diameters.

The front plate, back plate, and annular subassembly are formed of aluminum to make the overall tool lightweight and easy to handle by technicians. The seals may be formed from different deformable, resilient materials (for example, nitrile rubber) having varying durometers (i.e. EPDM 60-durometer, Buna-N 50-durometer).

The back plate defines multiple differently sized port connections to provide any desired connection with, for example, vent rod strings to address venting (i.e., steam, flare line, nitrogen purge, etc.) or a liquid level alarm.

The tool includes shoulder eye bolts, lugs, or both through which chains, cable, rope, and the like may be threaded to facilitate lifting. A technician may also simply grip the lugs to carry or handle the tool manually.

The tool is electronically monitored by a separate enhanced monitoring unit so that information can be relayed back and forth to the technician—for example, pressure testing, calibration, amount and pressure of air being pumped into the front and back inflatable seal elements, and alarm signal if either or both of the front and back seal elements should fail.

The enhanced monitoring unit provides analog pressure gauges, and a "double warning" by provision of digital pressure switches which measure pressure and display digital readings of pressure in green or red such that the readings are highly visible to the technician from a distance. The digital pressure switches are connected to a flasher which activates LED lights to blink, serving as a second back-up warning signal to accompany "red" readings. Visual signals are desirable where alarm bells or sirens may not be audible in a noisy environment or from a distance. However, audible alarms may also be provided.

The technician can safely replace the damaged section of pipe downstream from the tool. A pump at ground surface may be used to circulate pressurized medium (for example, water) down into the sealed space of the annular subassembly and back up to ground surface. The medium (for example, water) is brought to pressure in the sealed spaced defined by the annular subassembly. The pressure of the medium, which can be either static or flowing, is displayed by the analog pressure gauges and digital pressure switches, monitored, and provides an indication in real time of seal leakage. Observation of the readings will inform the technician if there is a reduction in medium pressure, thereby indicating seal leakage.

The tool can be used for hydrodynamic services. Instead of the medium (for example, water) remaining static in the sealed spaced defined by the annular subassembly, the medium can be circulated through the tool to remove heat away from the metal of the pipe and to protect the downstream or upstream piping from exposure to such heat. In one embodiment, the inflatable front and back seal elements can withstand a temperature greater than about 1100° F. (or about 593° C.).

In one aspect, the invention comprises an inflatable isolation tool for positioning in a pipe bore and providing a sealing barrier extending transversely across the pipe bore for isolating a section of the bore during replacement of a section of the pipe, the tool comprising a linear assemblage of components including:

a front plate defining recesses housing gripper inserts moveable from unactuated positions within the recesses to actuated positions extending outwardly from the recesses to contact and grip the inner surface of the pipe to hold the tool stationary during operation;

a back plate carrying support leg assemblies for assisting installation and removal of the tool within the pipe bore;

an annular subassembly positioned between the front plate and the back plate, and comprising an annular core and an annular ring defining grooves for engaging a pair of identical front and back inflatable seal elements;

the front and back inflatable seal elements being resilient, deformable and annular, wherein when the front plate, the back plate, and the annular subassembly are compressed, the front and back inflatable seal elements are prevented from dislodging into the interior of the tool, and are inflatable simultaneously to be deformed radially inwardly against the annular subassembly and radially outwardly into sealing engagement with the pipe, thereby combining with the outer surface of the tool and the inner surface of the pipe to form a tightly sealed annular space.

In another aspect, the invention comprises a monitoring unit for use with the above inflatable isolation tool. The monitoring unit comprises a housing, a front panel subassembly, a back panel, an electrical inlet, and a LED power supply. In one embodiment, the front panel subassembly comprises a pair of analog pressure gauges, and a pair of digital pressure switches for measuring pressure and displaying digital readings of pressure in color to provide a first visual signal, the digital pressure switches being electrically connected to a flasher for activating LED lights to provide a second visual signal.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings:

FIG. 6B is a front view of the back plate shown in FIG. 6A.

FIG. 6C is a cross-sectional view taken at section line I-I in FIG. 6B.

FIG. 6D is a perspective view of the back plate of the inflatable isolation tool shown in FIG. 1, showing the back face of the back plate.

FIG. 6E is a perspective view of a support leg assembly attachable to the back plate shown in FIG. 6D.

DETAILED DESCRIPTION OF PREFERRED EMBODIMENTS

Figure 1:
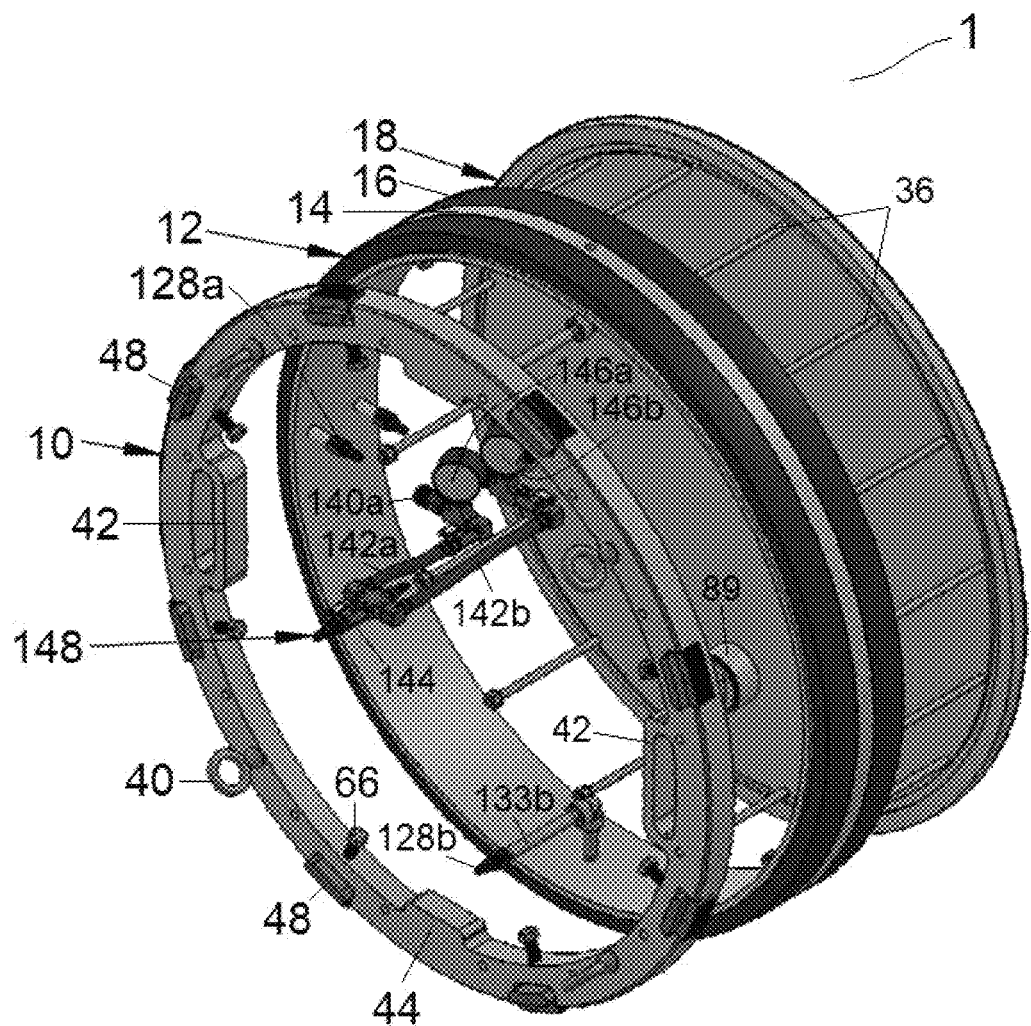
FIG. 1 is an exploded perspective view of one embodiment of an inflatable isolation tool, showing all components in greater detail.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

The present invention relates to a mechanical assembly or "isolation tool" for use in providing a sealing barrier extending transversely across the pipe bore for isolating a section of the bore during replacement of a section of the pipe, and an enhanced monitoring unit for same.

The invention will now be described having reference to the accompanying figures. The inflatable isolation tool (1) is shown unassembled in FIG. 1, and assembled and ready to operate in FIG. 3. The tool (1) is inserted into the bore of either a horizontal or vertical pipe, and seals against the pipe inner surface when in use. As used herein, the term "horizontal" means the orientation of a plane or line that is substantially parallel to the plane of the horizon. The term "vertical" means the orientation of a plane or line that is substantially at a right angle to the horizontal plane. In one embodiment, the pipe has an inner diameter of about 20 inches or greater. The purpose of the tool (1) is to provide a sealed barrier which prevents flammable fluid from migrating within the pipe bore to the point where cutting, welding or other hot-work operations are to be conducted.

The tool (1) generally comprises the following components: an isolation assembly incorporating a linear assemblage of components including a front plate (10), a front inflatable seal element (12), an annular subassembly (14), a back inflatable seal element (16), and a back plate (18). As used herein, the terms "front" and "back" are used to describe the positions of various components of the tool (1). The term "front" refers to a position closer to the open end of the pipe. The term "back" refers to a position away from the open end of the pipe. When the components are compressed together, the axially spaced apart annular front and back inflatable seal elements (12, 16) are then inflated to deform in two directions to reduce the risk of leaks—radially inwardly to press and seal against the annular subassembly (14) and radially outwardly into sealing engagement with the pipe, thereby combining with the outer surface of the tool and the inner surface of the pipe to form a sealed annular space. A support leg assembly (20) assists with installation and removal of the tool (1) within the pipe bore.

The tool (1) is shown unassembled in FIGS. 1, 2 and 4A-7B to show all the components in greater detail.

Figure 4A:
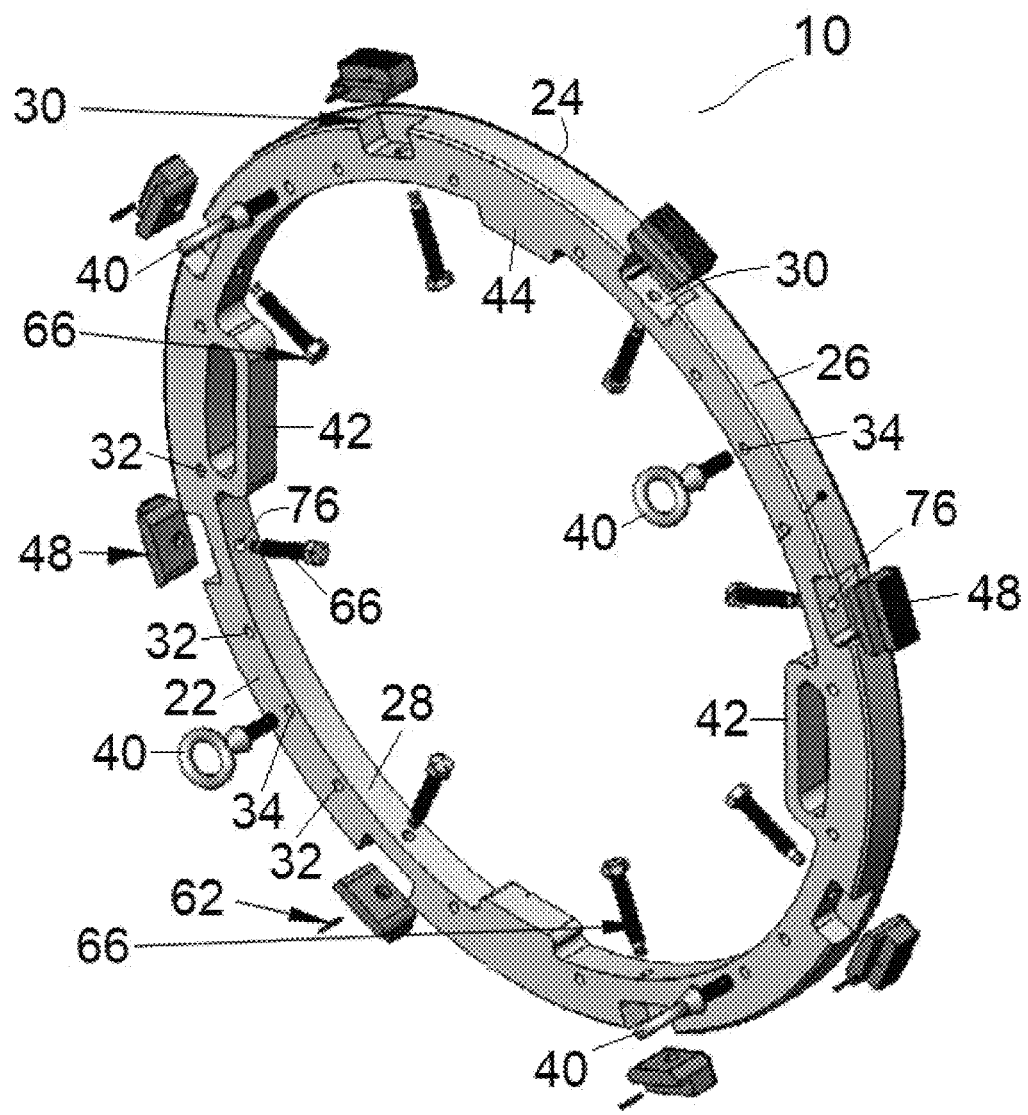
FIG. 4A is a perspective view of the front plate of the inflatable isolation tool shown in FIG. 1.
Figure 4B:
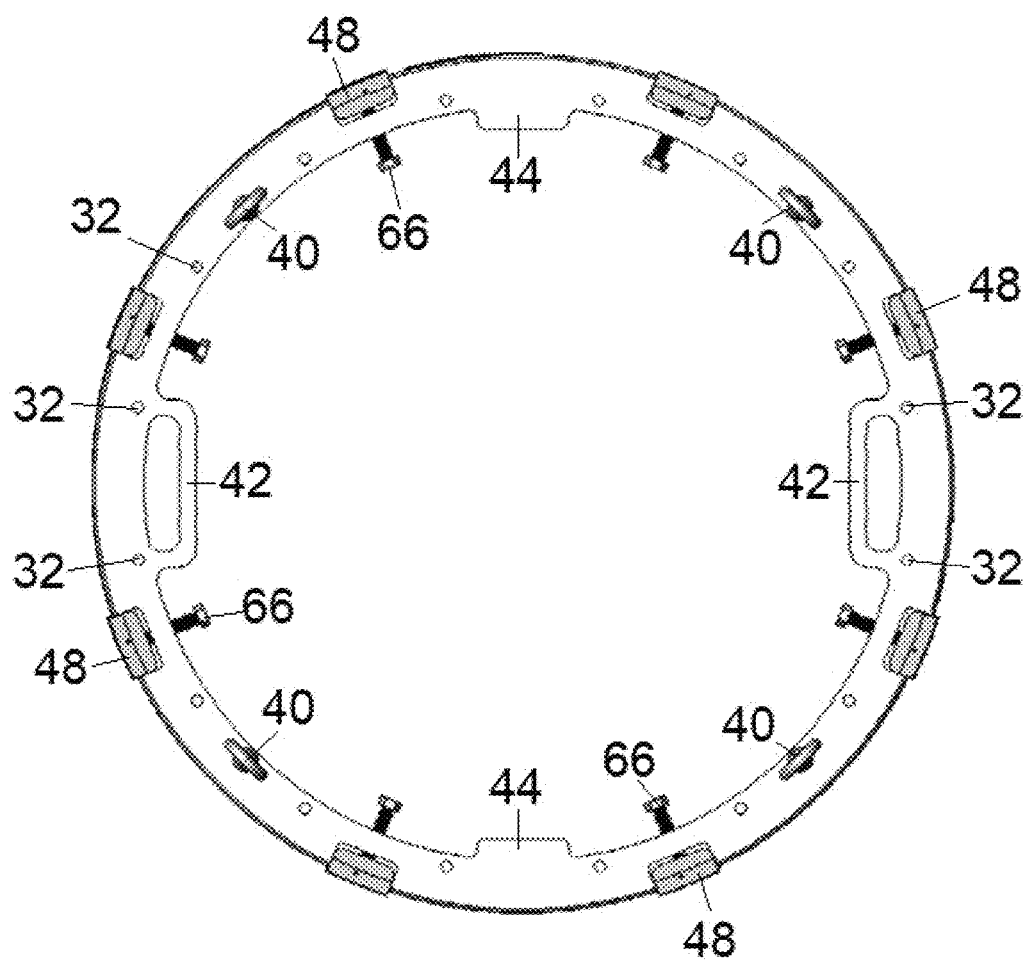
FIG. 4B is a front view of the front plate shown in FIG. 4A.

Referring to FIGS. 4A-B, the front plate (10) is a circular disk having a front face (22), a back face (24), an outer edge (26), an inner edge (28), a plurality of recesses (30), a plurality of first holes (32), and a plurality of second holes (34).

Figure 2:
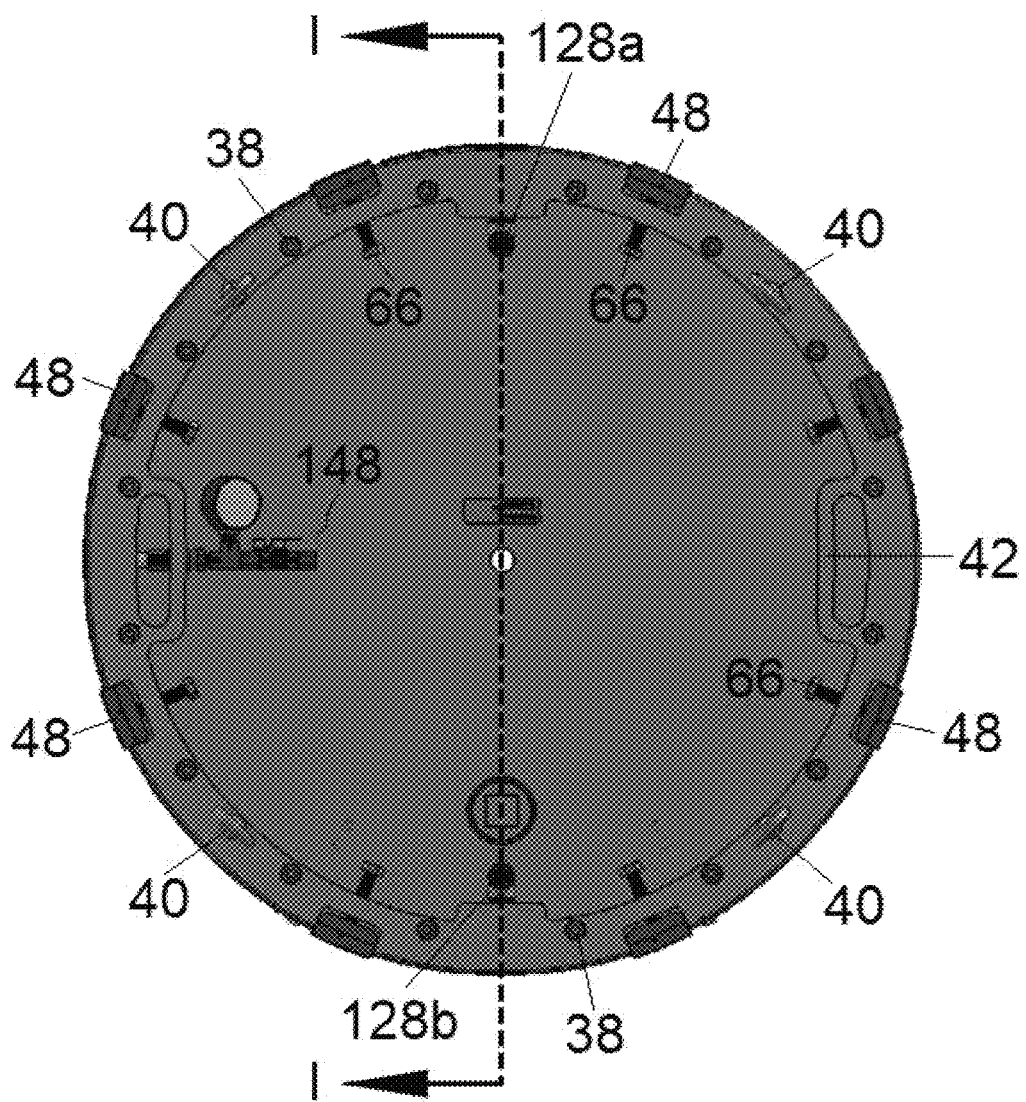
FIG. 2 is a front view of the inflatable isolation tool shown in FIG. 1.

The first holes (32) are disposed over at least a portion or the entirety of the front face (22) of the front plate (10). In one embodiment, the first holes (32) are evenly distributed in a spaced apart manner from adjacent first holes (32) over the front face (22). In one embodiment, a first hole (32) is positioned on each side of a recess (30). The first holes (32) extend through the front plate (10) from the front face (22) to the back face (24) for receiving elongated studs (36) therethrough which are secured by complementary hex nuts (38) and washers (39) to facilitate compression and assemblage of the components of the isolation tool (1), as shown in FIG. 2.

The second holes (34) are disposed over at least a portion or the entirety of the front face (22) of the front plate (10). In one embodiment, the second holes (34) are evenly distributed in a spaced apart manner from adjacent second holes (34) over the front face (22). In one embodiment, a second hole (34) is positioned between adjacent recesses (30) and between two first holes (32). The second hole (34) partially extends through the front plate (10) and defines threads (not shown) for receiving a complementary threaded shoulder eye bolt (40), as shown in FIGS. 1-4A-B. In one embodiment, four second holes (34) are used for a 24 inch diameter tool (1) to receive four shoulder eye bolts (40). However, it is contemplated that the number and size of the second holes (34) may vary without departing from the scope of the present invention.

In one embodiment shown in FIG. 1, the front face (22) includes a pair of opposed lugs (42) formed integral with the front plate (10) and projecting inwardly away from the outer edge (26) of the front plate (10). In one embodiment, lugs (42) are provided on a tool (1) having a diameter of about 30 inches or greater. On smaller tools (1) having a diameter ranging for example, from about 20 inches to about 24 inches, shoulder eye bolts (40) are preferred over lugs (42). The tool (1) may be lifted and moved using conventional oilfield equipment. Chains, cable, rope, and the like may be threaded through the shoulder eye bolts (40), lugs (42), or both to facilitate lifting. A technician may also simply grip the lugs (42) to carry or handle the isolation tool (1) manually. In one embodiment shown in FIG. 1, the front face (22) includes one or more protrusions (44) formed integral with the front plate (10) and projecting inwardly away from the outer edge (26) of the front plate (10). In one embodiment, the front face (22) includes two protrusions (44). The protrusion (44) supports a label or other tool information such as, for example, a serial number or other text.

The front face (22) defines recesses (30) which are positioned along at least a portion or the entirety of the outer edge (26) of the front plate (10). In one embodiment, the recesses (30) are evenly distributed in a spaced apart manner from adjacent recesses (30) along the outer edge (26) of the front plate (10). In one embodiment, eight recesses (30) are used for a 36 inch diameter isolation tool (1). However, it is contemplated that the number and size of the recesses (30) may vary without departing from the scope of the present invention. The recesses (30) are configured for receiving and accommodating complementary moveable gripper inserts (48). In one embodiment, the recesses (30) are substantially rectangular-shaped to receive and accommodate rectangular-shaped gripper inserts (48). While the Figures illustrate both rectangular-shaped recesses (30) and gripper inserts (48), it will be appreciated by those skilled in the art that other shapes are included with the scope of the invention.

Figure 5A:
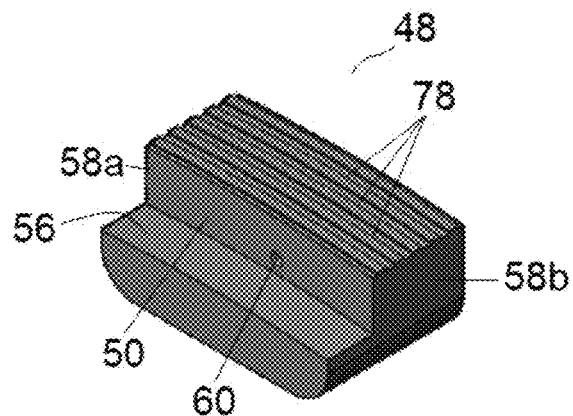
FIG. 5A is a perspective view of a gripper insert of the inflatable isolation tool shown in FIG. 1.
Figure 5C:
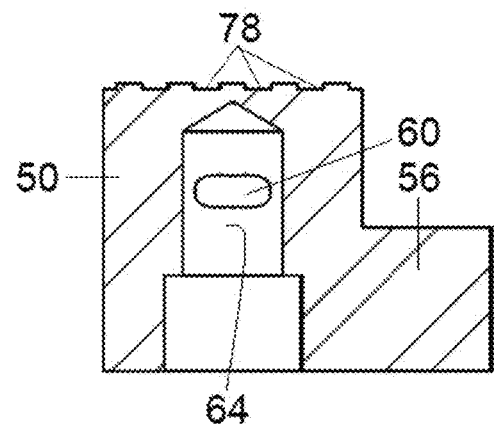
FIG. 5C is a cross-sectional view taken at section line I-I in FIG. 5B.
Figure 5B:
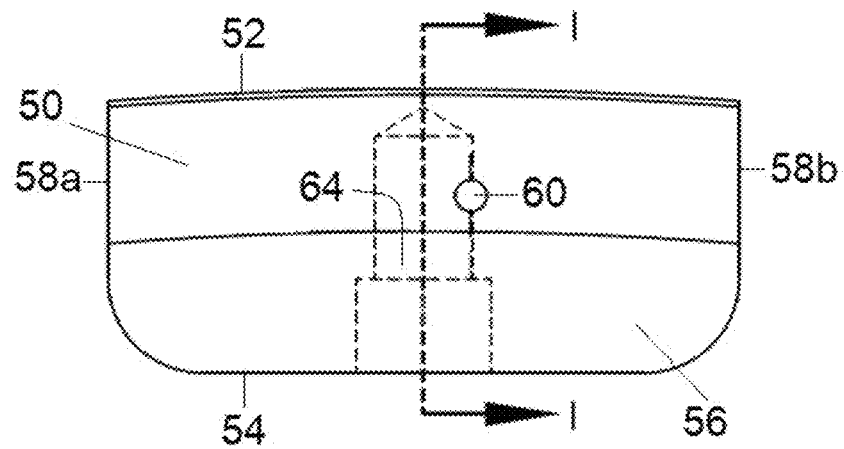
FIG. 5B is a side view of the gripper insert shown in FIG. 5A, showing the inner chamber in hidden lines.
Figure 5D:
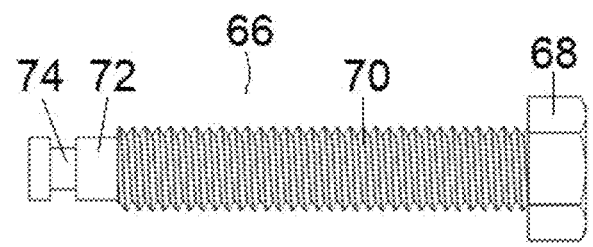
FIG. 5D is a side view of a bolt for insertion into the gripper pad shown in FIG. 5B.
Figure 6A:
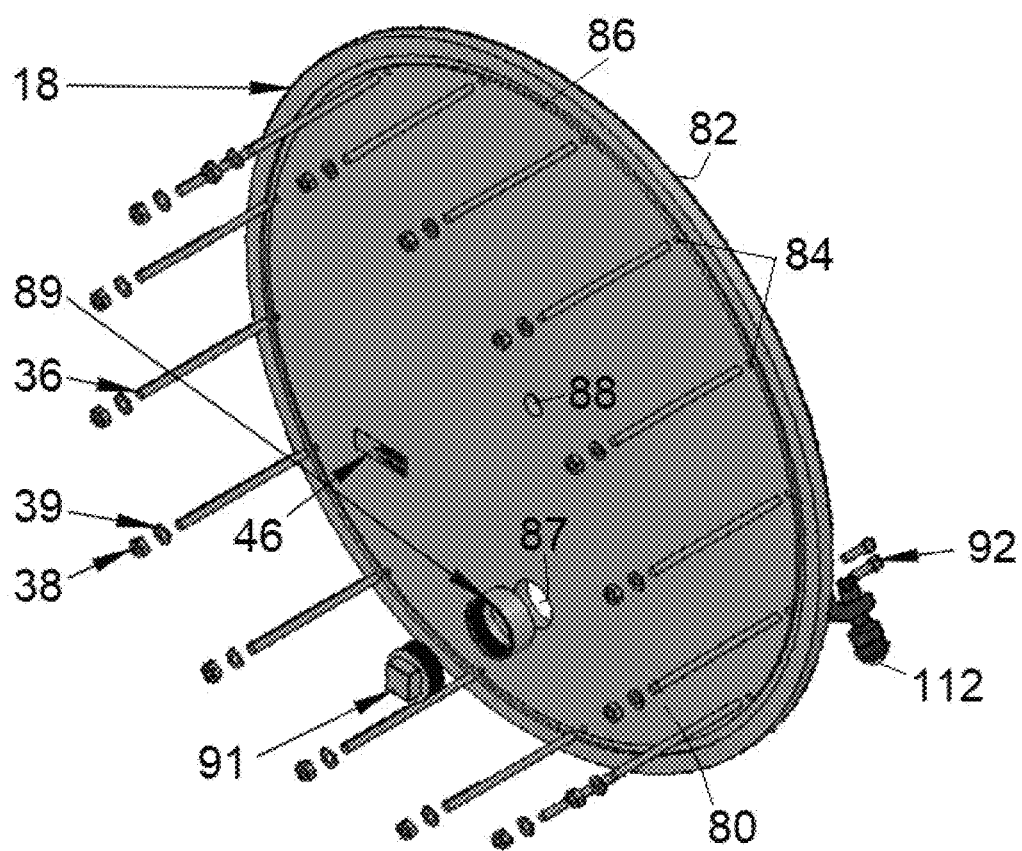
FIG. 6A is a perspective view of the back plate of the inflatable isolation tool shown in FIG. 1, showing the front face of the back plate.

As shown in FIGS. 5A-C, the moveable gripper insert (48) comprises a substantially rectangular-shaped body (50) having a top (52), bottom (54), and protruding edge (56). As viewed in cross-section in FIG. 5B, the top (52) is slightly concavely curved and the bottom (54) is substantially flat, while the sides (58a, 58b) are tapered. The body (50) defines an aperture (60) which extends through the body (50) for receiving a slotted spring pin (62) therethrough (FIG. 4A). The slotted spring pin (62) comprises a cylindrical pin rolled from a strip of material with a slot to allow flexibility during insertion. The slotted spring pin (62) comprises a body having a diameter which is larger than the diameter of the aperture (60), and a chamfer on either one or both ends to facilitate inserting the pin (62) into the aperture (60). The spring action of the pin (62) allows it to compress as it assumes the diameter of the aperture (60). The body (50) of the gripper insert (48) defines an inner chamber (64) configured to receive and secure a hex bolt (66) having a head (68), threads (70), and a modified smooth end (72), as shown in FIG. 5D. A portion of the smooth end (72) has been cut away during manufacture to define a stem (74).

The front plate (10) defines a plurality of threaded recess apertures (76) which extend through the front plate (10) from its outer edge (26) to its inner edge (28). When assembled, the hex bolt (66) is threaded into the recess aperture (76) and extends therethrough into the inner chamber (64) of the gripper insert (48). As shown in FIGS. 5B-C, the aperture (60) overlaps with the inner chamber (64). Placement of the slotted spring pin (62) through the aperture (60) contacts the stem (74) of the hex bolt (66) to retain the hex bolt (66) to the gripper insert (48).

The hex bolt (66) can be rotated manually by the technician to move the gripper insert (48) from a resting unactuated position within the recess (30) to an actuated position to extend outwardly from the recess (30) to contact and grip the inner surface of the pipe. The gripper insert (48) defines a plurality of strip grooves (78) which are formed in a longitudinal direction on the top (52) of the gripper insert (48) in order to yield a gripping, serrated non-slip surface. The gripper inserts (48) are conveniently moveable and adjustable to be tightened against the inner surface of various diameters of pipe in order to hold the tool (1) stationary in its proper position within the pipe, and to hold back pressure without being moved out of the tool (1). The tool (1) is thus easy and quick to deploy and remains stationary and stable within the pipe during use.

The protruding edge (56) of the gripper insert (48) receives and secures a temporary or sacrificial O-ring (not shown) which is thereby positioned overtop the front plate (10) in order to protect the front and back inflatable seal elements (12, 16) from hot sparks or slags.

As shown in FIGS. 6A-D, the back plate (18) is a circular disk having front and back faces (80, 82). The front face (80) may support a label (46) or other tool information such as, for example, a serial number or other text.

The back plate (18) defines a plurality of threaded holes (84) which are positioned over at least a portion or the entirety of the front face (80). In one embodiment, the holes (84) are evenly distributed in a spaced apart manner from adjacent holes (84) near the outer edge (86) of the front face (80). The holes (84) extend partially into the back plate (18) for receiving the complementary threaded ends of the elongated studs (36) which facilitate the compression and assemblage of the components of the isolation tool (1).

The back plate (18) serves as a barrier extending transversely of the pipe bore. It also plays a role in the action of compressing the front and back plates (10, 18) and annular subassembly (14) together. After the components have been compressed together, the axially spaced apart annular front and back inflatable seal elements (12, 16) can then be inflated to deform radially inwardly against the annular subassembly (14) and radially outwardly into sealing engagement with the pipe, thereby combining with the outer surface of the tool (1) and the inner surface of the pipe to form a tightly sealed annular space.

The back plate (18) defines one or more port connections comprising small, medium, or large diameter threaded apertures for re-routing any upstream vapors safely away from the hot-work area. The upstream activity may also be monitored through a gauge to further ensure the safety of hot-work. If any change is detected in upstream activity, hot-work is immediately stopped until the situation is resolved. For such purpose, the back plate (18) defines port connections extending therethrough to allow for gas venting (for example, steam, flare line, nitrogen purge, etc.) or provision of a liquid level alarm. In one embodiment, the back plate (18) defines a central threaded aperture (88). In one embodiment, the back plate (18) defines a peripheral threaded aperture (87) for receiving a threaded half-coupler (89) and threaded pipe plug (91). In one embodiment, the peripheral threaded aperture (87) has a diameter larger than the diameter of the central threaded aperture (88).

The back plate (18) defines two sets of openings (90) in proximity to the holes (84) on the lower portion of the back plate (18). In one embodiment, each set of openings (90) is positioned above and between two adjacent holes (84). Each set of openings (90) comprises a pair of aligned openings through which attachment means such as, for example, cap screws (92) extend therethrough for securing a support leg assembly (20).

As shown in FIG. 6E, the support leg assembly (20) comprises a substantially "L"-shaped body (94) having a vertical wall (96) perpendicular to a horizontal base (98). The vertical wall (96) defines a pair of openings (100) for receiving attachments means such as, for example, cap screws (92) to fasten the support leg assembly (20) to the undersurface or back face (82) of the back plate (18). The horizontal base (98) defines an aperture (110) for mounting a ball transfer unit bolt fixing comprising a roller ball (112) mounted within an adjustable bolt (114). In one embodiment, a pair of support leg assemblies (20) enables the tool (1) to be easily centered and deployed. The tool (1) can be rolled upon the movable roller balls (112) which are smooth and will not damage the bottom inner surface of the pipe, and can be easily rested in the desired position on the bottom inner surface of the pipe. The bolt (114) of the ball transfer unit bolt fixing is conveniently moveable and adjustable to different distances to accommodate various pipe diameters.

The support leg assemblies (20) assist with tool installation and removal, making the tool quick to deploy. In one embodiment, two support leg assemblies (20) support a 36 inch diameter isolation tool (1). However, it is contemplated that the number and style of the support leg assemblies (20) may vary without departing from the scope of the present invention. For example, in one embodiment (not shown), the roller ball (112) may be replaced by a wheel. In one embodiment (not shown), a gripper insert (48) is replaced by a bracket including movable roller balls. In one embodiment, a pair of gripper inserts (48) are replaced by a pair of brackets. Provision of front movable roller balls may be useful for long-reach applications.

Figure 7A:
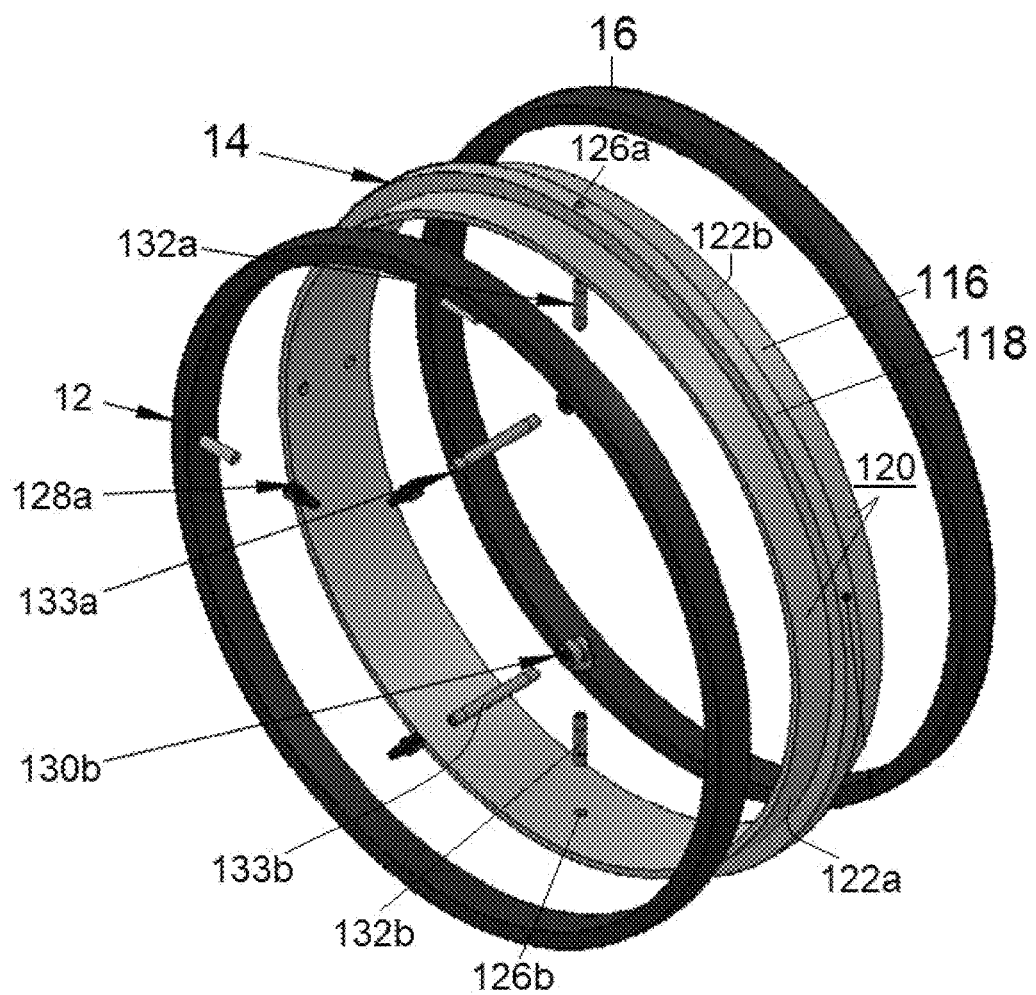
FIG. 7A is an exploded perspective view of the annular subassembly of the inflatable isolation tool shown in FIG. 1, showing the annular core, annular ring, and annular front and back inflatable seal elements.
Figure 7B:
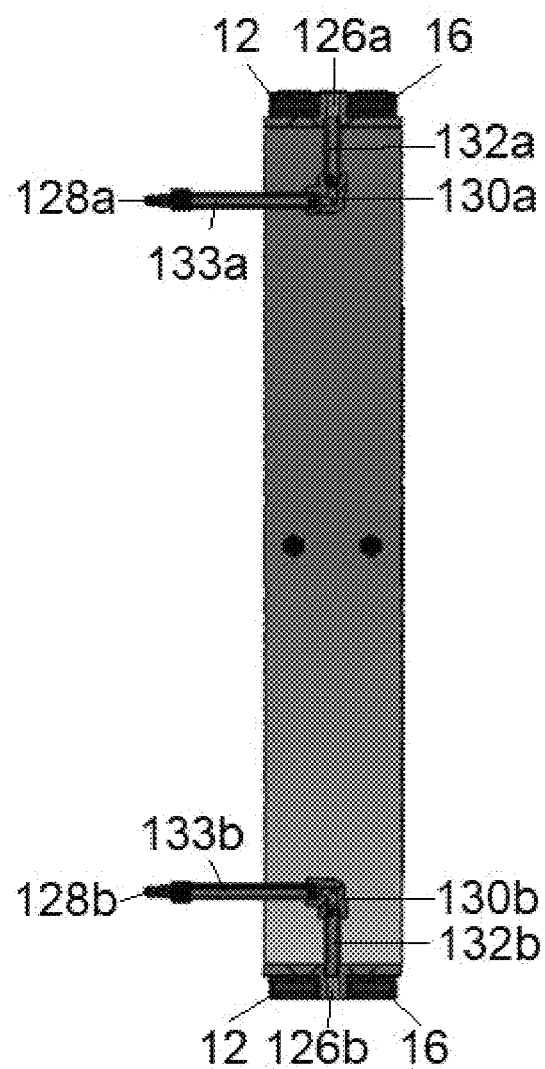
FIG. 7B is a cross-sectional view taken at section line I-I in FIG. 7A.

As shown in FIGS. 1 and 7A-B, the annular subassembly (14) is positioned between the front plate (10) and the back plate (18), and comprises an annular core (116) and an annular ring (118). In one embodiment, the annular core (116) and annular ring (118) are manufactured as separate components which are secured together by welding or other suitable technique known to those skilled in the art, and then machined to yield the annular subassembly (14). The annular core (116) and annular ring (118) are both substantially ring-shaped. The annular core (116) has a greater thickness than the thickness of the annular ring (118). However, the annular ring (118) has a greater diameter than the annular core (116) in order to fit and extend over the annular core (116), as shown in FIGS. 7A-B.

The annular ring (118) is positioned over the middle of the annular core (116) to define grooves (122a, 122b) on the outer surface (120) of the annular core (116). The grooves (122a, 122b) engage the front and back inflatable seal elements (12, 16) which extend over the annular core (116). The annular ring (118) abuts against the front and back inflatable seal elements (12, 16), and separates the front inflatable seal element (12) from the back inflatable seal element (16). The annular core (116) and annular ring (118) thereby prevent the front and back inflatable seal elements (12, 16) from slipping or collapsing into the internal cavity of the tool (1).

Figure 3:
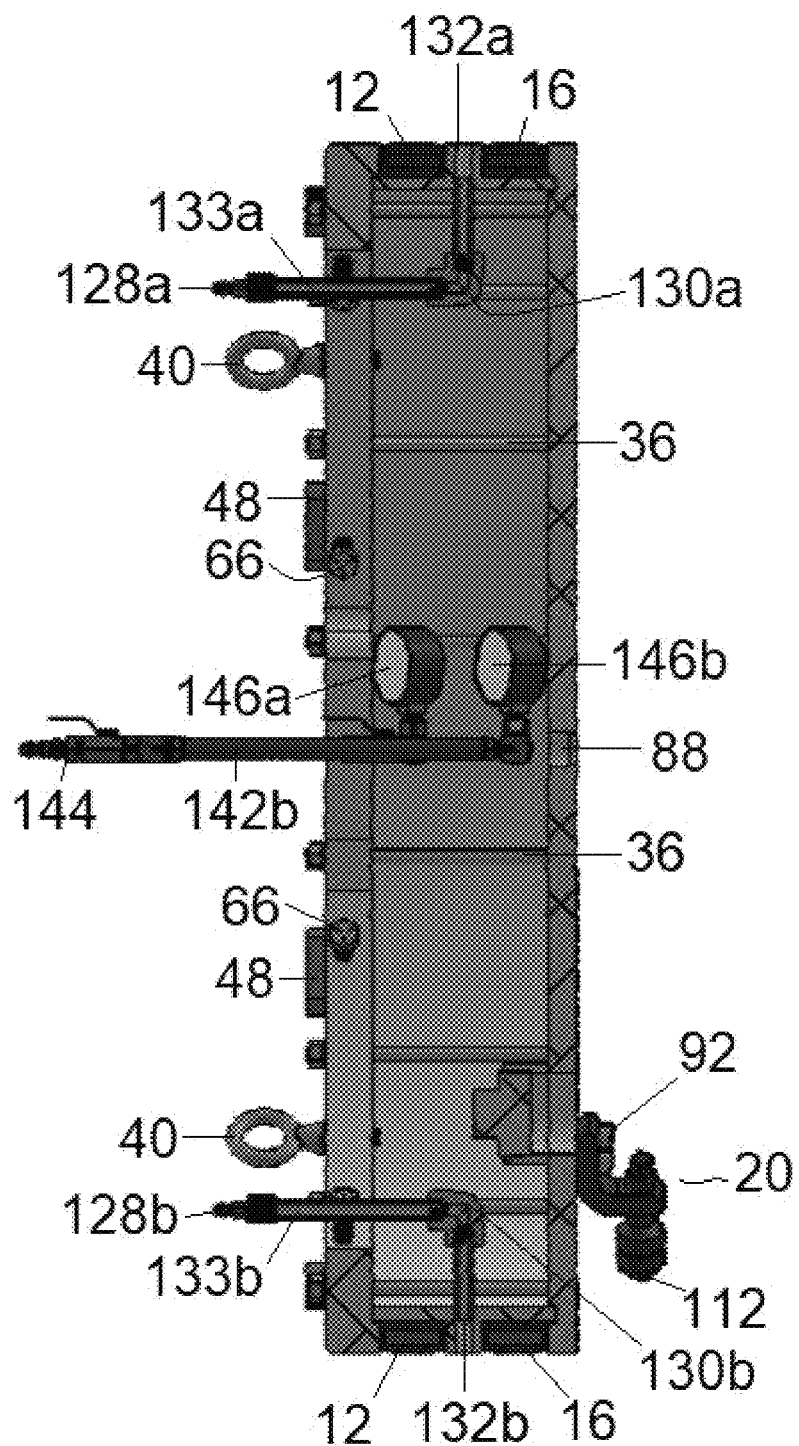
FIG. 3 is a cross-sectional view of the inflatable isolation tool shown in FIG. 1.

The annular ring (118) and annular core (116) define first and second opposed ports (126a, 126b) to receive connect plugs (128a, 128b) which extend therethrough (FIG. 3). In one embodiment, each connect plug (128a, 128b) comprises a brass connect plug which offers good corrosion resistance, low wear resistance, and is softer and easier to thread compared to steel plugs. The connect plugs (128a, 128b) couple to other components such as, for example, elbows (130a, 130b) and nipples (132a, 132b, 133a, 133b), in order to ultimately couple to hoses (not shown) in order to pump water in and out to monitor the competence of the front and back inflatable sealing elements (12, 16). One connect plug (128a) serves as the medium inlet, while the other connect plug (128b) serves as the medium outlet. Once the tool (1) is properly installed and the front and back inflatable seal elements (12, 16) are inflated, the medium (for example, water) is brought to pressure in the sealed spaced defined by the annular subassembly (14). A pressure gauge is used to display the pressure of the medium. The pressure of the medium, which can be either static or flowing, is monitored and provides an indication in real time of seal leakage. Observation of the gauge reading will inform the technician if there is a reduction in medium pressure, thereby indicating seal leakage.

The tool (1) provides a pair of identical inflatable front and back seal elements (12, 16) positioned in the midsection of the tool (1) by the annular subassembly (14). The front and back inflatable seal elements (12, 16) are annular and formed of deformable, resilient elastomeric material, such as ethylene propylene diene monomer (M-class) rubber (abbreviated as "EPDM" rubber). In one embodiment, the front and back inflatable seal elements (12, 16) comprise EPDM rubber seals having a square profile (DR94, Dynamic Rubber, Inc).

As shown in FIG. 1, the front and back inflatable seal elements (12, 16) are configured with threaded pipe lock nuts (140a, 140b) which couple to tubing (142a, 142b) connected to a gas inlet (144) and pressure gauges (146a, 146b) in order to pump gas (for example, nitrogen) into the front and back seal elements (12, 16) to inflate them simultaneously, and to monitor the pressure of the front and back inflatable sealing elements (12, 16) during their expansion. While FIGS. 1 and 3 illustrate an exemplary "plumbing assembly" (148) for inflating the front and back seal elements (12, 16), it will be appreciated by those skilled in the art that other assemblies for gas inflation and pressure measurement are included with the scope of the invention. The tool (1) effectively "self-centers" within the pipe in its proper position as gas is pumped into identical front and back inflatable seal elements (12, 16) simultaneously through a single gas inlet (144) of a shared plumbing assembly (148).

Having front and back inflatable seal elements (12, 16) with a comparatively large radial expansion capability allows more flexibility and convenience since the tool (1) can be used within a greater range of pipe diameters. This also translates into minimal manufacturing costs and substantial operational cost savings for both companies and their clients. Further, the provision of two axially separated front and back inflatable seal elements (12, 16) provides a safety factor. The spaced inflatable seal elements (12, 16) can be monitored for seal leakage which, if detected, may provide an opportunity to terminate welding.

The tool (1) can be constructed from any material or combination of materials having suitable properties such as, for example, mechanical strength, ability to withstand cold and adverse field conditions, corrosion resistance, and ease of machining. In one embodiment, the front plate (10), back plate (18), and annular subassembly (14) are formed of aluminum, making the tool (1) considerably lightweight compared to prior art isolated tools formed of steel and other materials heavier than aluminum; for comparison, a prior art steel isolated tool weighs about 490 pounds. In one embodiment, the tool (1) of 36 inches diameter has a weight of about 130 pounds. The front and back inflatable seal elements (12, 14) may be formed of EPDM rubber. The attachment means (36, 38, 39, 40, 66, 92, 140a, 140b) (e.g., elongated studs, hex nuts, washers, shoulder eyebolts, slotted spring pins, hex bolt, cap screws, threaded pipe lock nuts) and ball transfer unit bolt fixing (112, 114) may be formed of steel, for example, stainless steel, carbon steel, and strength-bearing materials. The connect plugs (128a, 128b), elbows (130a, 130b), and nipples (132a, 132b, 133a, 133b) may be formed of brass and the like. The gripper inserts (48) are formed of stainless steel for material contact-compatibility considerations.

Once assembled, the tool (1) can be quickly deployed in minutes (for example, 10-15 minutes) rather than hours or days as necessary with prior art isolation tools. Operation of the tool (1) generally involves inserting the fully assembled tool (1) into the pipe bore. The bolts (114) of the support leg assemblies (20) are pre-adjusted to a distance which accommodates the specific diameter of the pipe, and the tool (1) is rolled on the support leg assemblies (20) to partially "self-center" into the desired position within the pipe. The hex bolts (66) are then rotated manually by the technician to move the gripper pads (48) from their resting unactuated positions within the recesses (30) to actuated positions to extend outwardly from the recesses (30) to contact and grip the inner surface of the pipe. The plumbing assembly (148) is then activated to pump gas through the gas inlet (144) into the front and back inflatable seal elements (12, 16) which expand until they seal against the inner surface of the pipe. In one embodiment, the pressure of gas being pumped into the front and back inflatable seal elements (12, 16) may be monitored visually by reading the pressure gauges (146a, 146b).

Figure 8A:
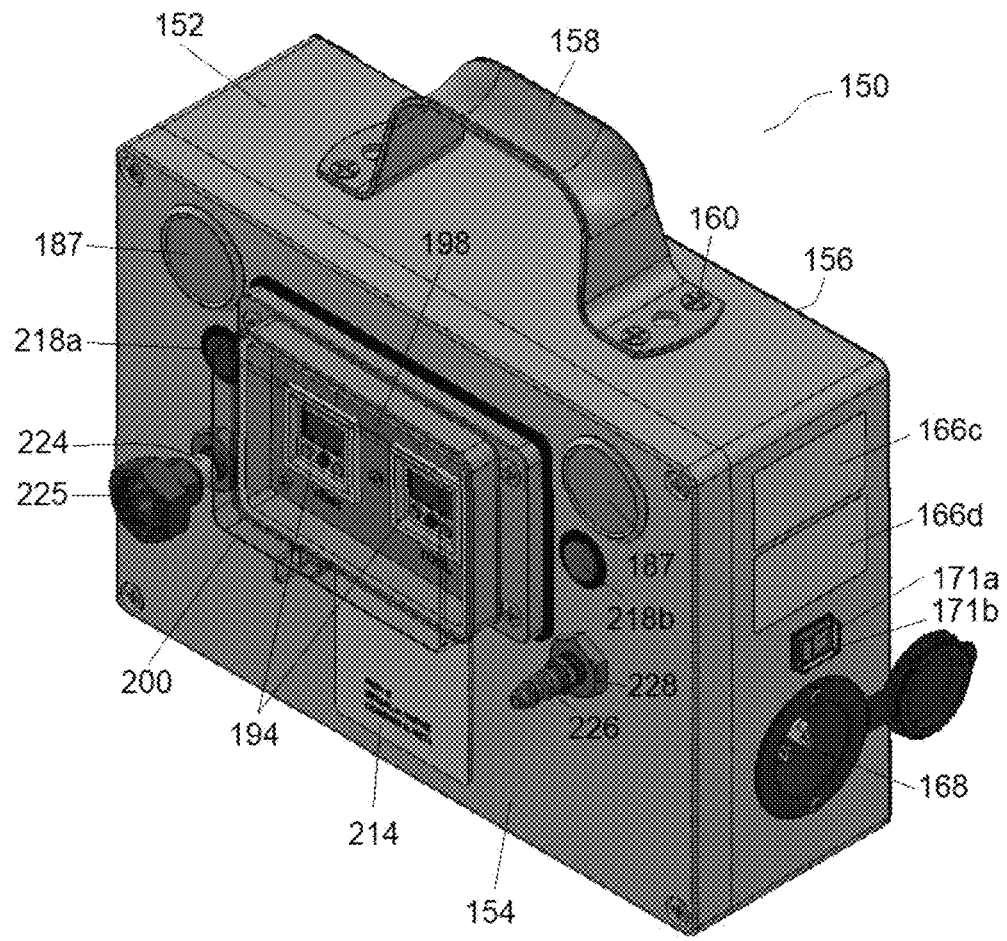
FIG. 8A is a front view of one embodiment of an enhanced monitoring unit for use with the inflatable isolation tool of FIG. 1.
Figure 8B:
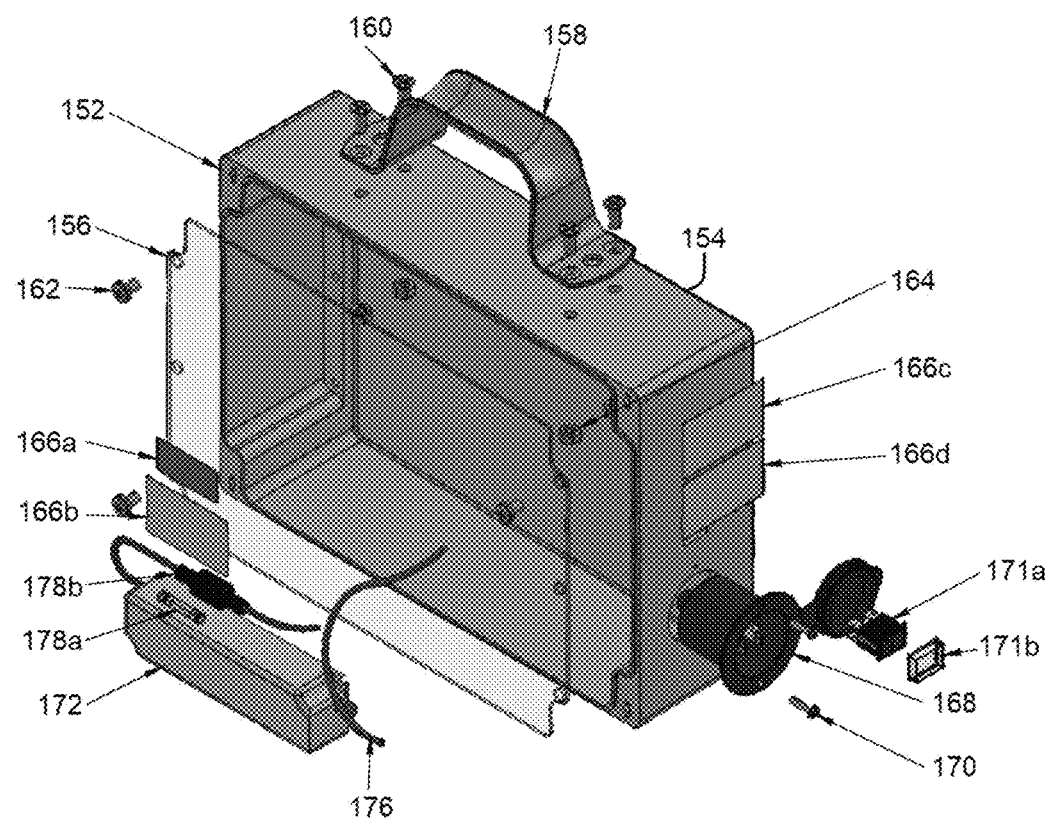
FIG. 8B is an exploded perspective view of the enhanced monitoring unit main housing subassembly shown in FIG. 8A.
Figure 8C:
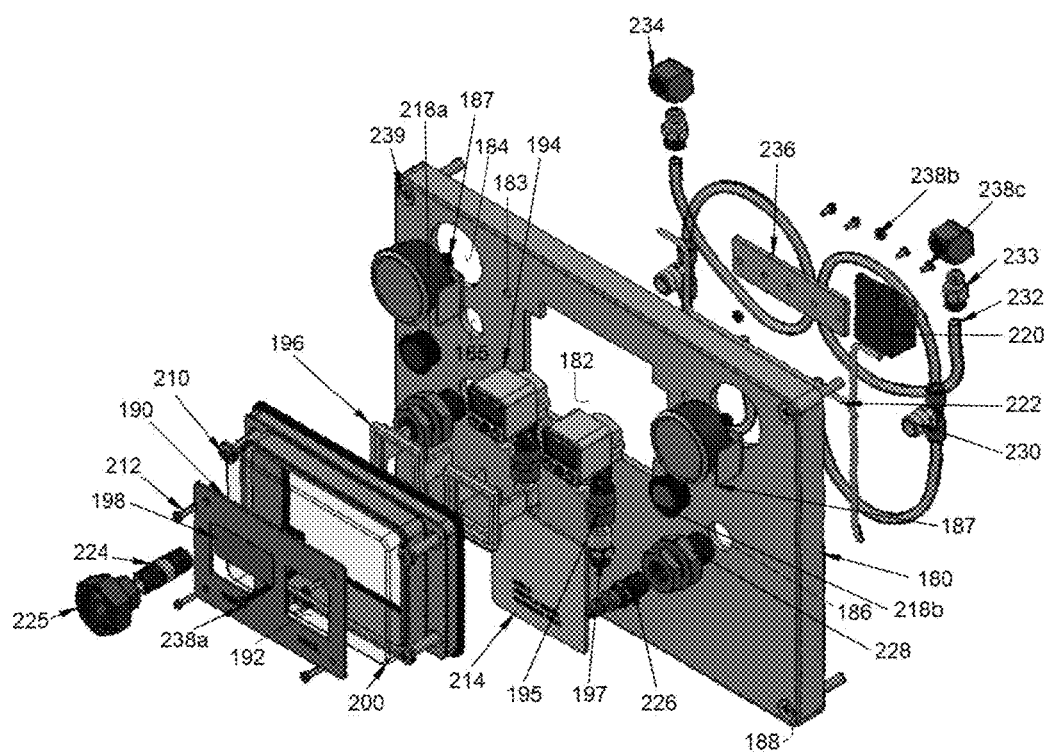
FIG. 8C is an exploded perspective view of the enhanced monitoring unit front panel subassembly shown in FIG. 8A, showing all inner components in greater detail.

In one embodiment, the pressure of gas being pumped into the front and back inflatable seal elements (12, 16) may be monitored remotely by using a separate enhanced monitoring unit (150), as shown in FIGS. 8A-C. The monitoring unit (150) relays information back and forth to the technician; for example, pressure testing, calibration, amount and pressure of gas being pumped into the front and back inflatable seal elements (12, 16), and an alarm signal if the front and back seal elements (12, 16) fail.

The enhanced monitoring unit (150) generally comprises a housing (152), a front panel subassembly (154), and a back panel (156) which are assembled together to form a substantially rectangular-shaped box to which a handle (158) may be attached by suitable attachment means (160). The back panel (156) is removably attached by fastening means (162, 164) in order to allow access to the front panel subassembly (154). Various required labels (166a, 166b, 166c, 166d) are attached to the monitoring unit (150) including for example, certification stickers, notice labels, warning labels, manufacturing labels, and the like. An electrical inlet (168) is attached to one side of the housing (152) by attachment means (170) for receiving a power cord which connects the monitoring unit (150) to an electricity supply. In one embodiment (not shown), internal batteries are provided, negating the need to connect the monitoring unit (150) to an electricity supply. An LED green illuminated rocker switch (171a) with a protective cover (171b) serves as an "ON/OFF" switch. The electrical inlet (168) is raintight and water resistant to seal out moisture and debris. A power supply (172) is electrically connected through wiring (176) to the front panel subassembly (154) for powering the LEDs. A fuse (178a) and fuse holder (178b) provide overcurrent protection of the electrical circuit.

The front panel assembly (154) is shown unassembled in FIG. 8C to show the inner components in greater detail. The front panel (180) comprises a substantially rectangular-shaped plate defining a window (182), window openings (183), top openings (184), middle openings (185), bottom openings (186), and corner openings (188).

The window (182) is configured for receiving and accommodating a pressure switch mounting plate (190). The pressure switch mounting plate (190) defines a pair of apertures (192) for receiving a pair of digital pressure switches (194) which are mounted to the plate (190) by brackets (196), and are attached to a pipe fitting (195) and a tube fitting (197). A required label (e.g., certification sticker and the like) (198) may be affixed to the pressure switch mounting plate (190). A transparent housing (200) is positioned over the digital pressure switches (194) and mounted by attachment means (210). The housing (200) is secured to the pressure switch mounting plate (190) by fastening means (212). An optional identification tag (214) may be attached to the monitoring unit (150) by suitable attachment means.

The top openings (184) receive pressure gauges (187). In one embodiment, the pressure gauges (187) are analog pressure gauges. The middle openings (185) receive LED lights (218) which are mounted therein. In one embodiment, a first LED light is red (218a) and a second LED light is amber (218b). The LED lights (218a, 218b) are electrically connected to an electronic flasher (220) by wiring (222).

The bottom openings (186) receive a nipple (224), a malleable union fitting (225), and a connect plug (226) which couple to other components such as, for example, complementary fittings (228) in order to couple to tube fittings (230). The tube fittings (230) receive tubing (232). The tubing (232) is attached to a tube fitting (233) and elbows (234) which in turn are connected to the bottom ported digital pressure switches (194). A pressure switch retainer (236) and attachment means (238a, 238b, 238c) secure the digital pressure switches to the front panel (180).

The corner openings (188) receive attachment means (239) which extend therethrough to secure the front panel (180) to the housing (152).

The tool (1) may be electronically monitored by being connected to the monitoring unit (150) using suitable hoses (not shown) which connect to each of the nipple (224) and the connect plug (226). In one embodiment (not shown), a flow meter is provided for monitoring the flow rate of vent gas. In one embodiment, pressure readings are provided by both the analog pressure gauges (187) and digital pressure switches (194). Each digital pressure switch (194) of the monitoring unit (150) is initially adjusted using buttons to set the desired minimum and/or maximum pressure for each of the "VENT" and "TOOL." The digital pressure switch (194) measures pressure and displays digital readings of pressure in green or red such that the readings are highly visible to the technician from a distance. "Green" indicates readings of pressure which meet the minimum and/or maximum set pressure. "Red" indicates readings of pressure exceeding the maximum set pressure or pressure falling below the minimum set pressure. The digital pressure switches (194) are electrically connected to the flasher (220) which activates the LED lights (218*a*, 218*b*) to blink, serving as additional warning signs to accompany "red" readings. The technician is thus warned of a problem with the tool (1) by "double" visual signals. Visual signals are desirable where alarm bells or sirens may not be audible in a noisy environment or from a distance. However, audible alarms or output messages to hand-held devices, multiprocessor systems, microprocessor-based or programmable consumer electronics, personal computers, network PCs, mini-computers, mainframe computers, mobile phones, smart phones, tablets, personal digital assistants, and the like, may also be provided. In one embodiment, such devices may be temporarily or permanently connected to the monitoring unit (150) through a wireless communication protocol in order to set, read and/or monitor the configuration, programming, operation, and messages from the monitoring unit (150), and to allow data storage and retrieval.

A data acquisition system (not shown) captures and records inputs from the digital pressure switches (194). Such data or other information are relayed to the technician using a wireless transmitter; for example, pressure testing, calibration, amount and pressure of air being pumped into the front and back inflatable seal elements, alarm signal if the either or both of the front and back seal elements should fail.

With the isolation tool (1) and seals (12, 16) securely in place, and the monitoring unit (150) operating, the technician can safely replace the damaged section of pipe downstream from the isolation tool (1). A pump at ground surface may be used to circulate pressurized medium (for example, water) down into the sealed space of the annular subassembly (14) and back up to ground surface. The medium (for example, water) is brought to pressure in the sealed spaced defined by the annular subassembly (14). The pressure of the medium, which can be either static or flowing, is displayed by the analog pressure gauges (187) and digital pressure switches (194), monitored, and provides an indication in real time of seal leakage. Observation of the readings will inform the technician if there is a reduction in medium pressure, thereby indicating seal leakage. After use of the tool (1), the technician needs only to deflate the gas from within the front and back seal elements (12, 16) and readjust the gripper inserts (48) to remove the tool (1) from the pipe bore.

The tool can also be used for hydrodynamic services. Instead of the medium (for example, water) remaining static in the sealed spaced defined by the annular subassembly, the medium can be circulated through the tool to remove heat away from the metal of the pipe and to protect the downstream or upstream piping from exposure to such heat. In one embodiment, the inflatable front and back seal elements can withstand a temperature greater than about 1100° F. (or about 593° C.).

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Accordingly, various changes and modifications can be made to the exemplary embodiments and uses without departing from the scope of the invention as defined in the claims that follow.

What is claimed is:

1. An inflatable isolation tool for positioning in a pipe bore and providing a sealing barrier extending transversely across the pipe bore for isolating a section of the bore during replacement of a section of the pipe, the tool comprising a linear assemblage of components including:
   a front plate defining recesses housing gripper inserts moveable from unactuated positions within the recesses to actuated positions extending outwardly from the recesses to contact and grip the inner surface of the pipe to hold the tool stationary during operation;
   a back plate carrying support leg assemblies for assisting installation and removal of the tool within the pipe bore;
   an annular subassembly positioned between the front plate and the back plate, and comprising an annular core and an annular ring defining grooves for engaging a pair of identical front and back inflatable seal elements;
   the front and back inflatable seal elements being resilient, deformable and annular, and comprising threaded pipe lock nuts for coupling to a single gas inlet for inflating the front and back inflatable seal elements simultaneously, wherein when the front plate, the back plate, and the annular subassembly are compressed, the front and back inflatable seal elements are prevented from dislodging into the interior of the tool, and are inflatable simultaneously to be deformed radially inwardly against the annular subassembly and radially outwardly into sealing engagement with the pipe, thereby combining with the outer surface of the tool and the inner surface of the pipe to form a tightly sealed annular space.

2. The tool of claim 1, wherein the pressure of gas inflating the front and back inflatable seal elements is monitored by a monitoring unit.

3. The tool of claim 2, wherein the monitoring unit comprises a housing, a front panel subassembly, a back panel, an electrical inlet, and a LED power supply.

4. The tool of claim 3, wherein the front panel subassembly comprises a pair of analog pressure gauges, and a pair of digital pressure switches for measuring pressure and displaying digital readings of pressure in color to provide a first visual signal, the digital pressure switches being electrically connected to a flasher for activating LED lights to provide a second visual signal.

5. The tool of claim 1, wherein elongated studs extend through apertures defined by the front plate and the back plate, and are secured by complementary hex nuts for compressing the components together.

6. The tool of claim 5, wherein each gripper insert defines strip grooves formed in a longitudinal direction on top of the gripper insert to yield a gripping, serrated non-slip surface.

7. The tool of claim 6, wherein each gripper insert further comprises a body defining an aperture for receiving a slotted spring pin therethrough, and an inner chamber for receiving and securing a hex bolt adjustable to actuate the gripper pad.

8. The tool of claim 7, wherein the hex bolt comprises an end defining a stem cooperative with the slotted spring pin.

9. The tool of claim 8, wherein the front plate defines recess apertures for receiving the hex bolt therethrough into the inner chamber of the gripper insert.

10. The tool of claim 7, wherein each gripper insert defines a protruding edge for securing a sacrificial O-ring to protect the front and back inflatable seal elements.

11. The tool of claim 1, wherein each support leg assembly comprises a substantially L-shaped body having a vertical wall perpendicular to a horizontal base, and defining openings for receiving attachment means for attaching the support leg assembly to the back plate, the horizontal base defining an aperture for mounting an adjustable bolt and roller ball.

12. The tool of claim 1, wherein the annular ring and annular core define a pair of opposed ports for receiving connect plugs for coupling to water hoses for testing seal leakage.

13. The tool of claim 1, wherein the back plate defines one or more port connections extending therethrough to allow for gas venting or provision of a liquid level alarm.

14. The tool of claim 1, wherein the front plate is configured with shoulder eye bolts, opposed lugs or both to facilitate lifting of the tool.

\* \* \* \* \*